United States Patent [19]

Carrington et al.

[11] Patent Number: 5,047,968
[45] Date of Patent: Sep. 10, 1991

[54] ITERATIVE IMAGE RESTORATION DEVICE

[75] Inventors: Walter A. Carrington; Kevin E. Fogarty, both of Worcester, Mass.

[73] Assignee: University of Massachusetts Medical Center, Worcester, Mass.

[21] Appl. No.: 512,504

[22] Filed: Mar. 20, 1990

Related U.S. Application Data

[63] Continuation of Ser. No. 164,137, Mar. 4, 1988, abandoned.

[51] Int. Cl.$^5$ .................... G06F 15/332; G06K 9/40
[52] U.S. Cl. .................... 364/574; 364/576; 364/572; 364/726; 382/54; 382/43; 358/36; 358/167; 356/237
[58] Field of Search ............... 364/574, 576, 553, 525, 364/572, 726; 356/237; 358/314, 10, 36, 155, 160, 167; 382/54, 65, 43

[56] References Cited

U.S. PATENT DOCUMENTS

| | | | |
|---|---|---|---|
| 3,973,112 | 8/1976 | Sloane | 364/576 |
| 3,987,243 | 10/1976 | Schwartz | 358/160 |
| 4,067,060 | 1/1978 | Poussart et al. | 364/576 |
| 4,164,788 | 8/1979 | Jain | 364/576 |
| 4,633,504 | 12/1986 | Wihl | 356/237 |
| 4,713,782 | 12/1987 | Blackham | 364/553 |

OTHER PUBLICATIONS

"Indirect Estimation of Physiological Distribution Functions", by S. V. Dawson et al., Federation Proceedings, vol. 37, No. 14, Dec. 1978, pp. 2803-2810.
"3-D Molecular Distribution in Living Cells by Deconvolution of Optical Sections Using Light Microscopy", by W. Carrington et al., Proceedings of 13th Northeast Bioengineering Conf., K. Foster, Editor, IEEE, Mar. 12, 1987, pp. 1-3, FIGS. 2A, 2B, 3, 20 and 26.
"Estimating Solutions of First Kind Integral Equations with Nonnegative Constraints and Optimal Smoothing", by J. P. Butler et al., *SIAM Journal of Numerical Analysis*, vol. 15, No. 3, Jun. 1981, pp. 381-397.
"Constrained Interpolation and Smoothing", by Larry D. Irvine et al., *Constructive Approximation* (1986) 2:129-151.

*Primary Examiner*—Parshotam S. Lall
*Assistant Examiner*—V. Trans
*Attorney, Agent, or Firm*—Hamilton, Brook, Smith & Reynolds

[57] ABSTRACT

An image restoration device restores images which are viewed through an optical member and stored in a data processor. Processing means associated with the data processor iteratively determine, for each point in a viewed image, a factor which minimizes noise and distortion at that point. The factor is iteratively determined through a division operation of a transform of a first function of a response function of the optical member and a transform of a second function of the response function. Preferably, the transform is a Fourier transform and the response function is the point spread function of the optical member. The processing means displays the restored image on a suitable display unit (e.g. a CRT).

16 Claims, 2 Drawing Sheets

ITERATIVE IMAGE RESTORATION DEVICE

This is a continuation of co-pending application Ser. No. 07/164,137 filed on Mar. 4, 1988 now abandoned.

BACKGROUND OF THE INVENTION

Various observation enhancing devices exist for viewing a subject. In general, the device transforms the subject and provides a distorted image which is viewed. More accurately, the transformed subject is further distorted by noise in electronics involved, optical noise from surrounding light, and/or quantum noise of random photons. Thus, the viewed image is a transformed, imperfect version of the subject as illustrated in FIG. 1.

The subject 7 is mathematically represented as a function f. The observation enhancing device 9 transforms or distorts the subject 7 by a function k. The generated image 11 (referenced as g) is viewed as an array of measured data points $g_i$ which includes a noise or measurement error factor $\epsilon$. The distorted image is then stated mathematically as $$g_i = \int_D k_i(x) f(x) dx + \epsilon_i$$

That is, each point or pixel i in the viewed image g involves a sum of the light contributed from other neighboring points x on the subject 7 and an unknown noise or measurement error $\epsilon_1$. The sum is over the set D of viewed points image.

In accordance with this contribution, a 3-D subject introduces a further complication. In addition to light contributed from neighboring points on the same plane, a 2-D slice or a view of a plane through the 3-D subject is blurred by light contributed to the viewed plane from neighboring planes. Hence, the distortion becomes a more complex problem.

Various devices and schemes have been developed to define and subsequently reverse such distortion to provide what is called a restored image of the subject. Some of the schemes involve a matrix of measured points which define the distortion and noise or measurement error. The matrix is inverted to provide a restored image. These schemes, however, are typically cumbersome and unsuitable for images with hundreds of data points or more.

SUMMARY OF THE INVENTION

An object of the present invention is to provide a method and device for correcting optical distortion and for providing a restored image, especially one from a viewed image of hundreds of data points.

A further object of the present invention is to provide such a method and device which involves a division operation at each pixel instead of an inversion of a matrix.

In particular, the device of the present invention includes an optical viewing member through which the subject is viewed, a data processor for receiving and storing a series of viewed images of the subject as viewed through the optical viewing member, processing means associated with the data processor for restoring the viewed images, and display means for providing a view of the restored images. The processing means restores the viewed images by iteratively determining, for each point in a viewed image, a factor which minimizes noise and distortion at that point. The factor is iteratively determined through a division operation, in a transform domain, of functions of the response function of the optical viewing member. In a preferred embodiment, the factor is iteratively determined through a division operation in a Fourier transform domain of the response function.

More specifically, the factor is iteratively determined by the relationship $$c_{n+1} = c_n \cdot \Delta$$

where
c is the factor;
n is the number of iterations of c; and
$\Delta$ = inverse Fourier transform of
$(\Psi'/(H H^* + \alpha + \lambda))$;
where $\Psi'$ is the Fourier transform of $\psi'$, $$\psi' = (M + \alpha I) c - g;$$

M is a matrix of viewed image points along orthogonal axes i and j, and defined as $$M_{ij} = \int_{D(c)} k_i(x) k_j(x) dx$$

D(c) is the set of viewed image points in which $\Sigma k_i(x) c_i \geq 0$, and
$k_i(x)$ is the response function of the optical viewing member at image pixel i over surrounding points x;
$k_j(x)$ is the response function at image pixel j;
$\alpha$ and $\lambda$ are constants ($\geq 0$);
I is the Identity matrix;
g is an array of measured values of the points in the image;
H is the Fourier transform of h(x) which is another form of the response function $k_i(x)$; and $H^*$ is the Fourier transform of $\tilde{h}(x)$ in which $$\tilde{h}(x) = h(-x).$$

The h(x) form of the response function $k_i(x)$ may be the point spread function of the optical viewing member such that $$k_i(x) = h(y_i - x)$$

where i is a point of the viewed image; and $y_i$ is the corresponding point on the subject.

BRIEF DESCRIPTION OF THE DRAWINGS

The foregoing and other objects, features and advantages of the invention will be apparent from the following more particular description of a preferred embodiment of the invention, as illustrated in the accompanying drawings. The drawings are not necessarily to scale, emphasis instead being placed upon illustrating the principles of the invention.

DETAILED DESCRIPTION OF THE PREFERRED EMBODIMENT

Figure 2:
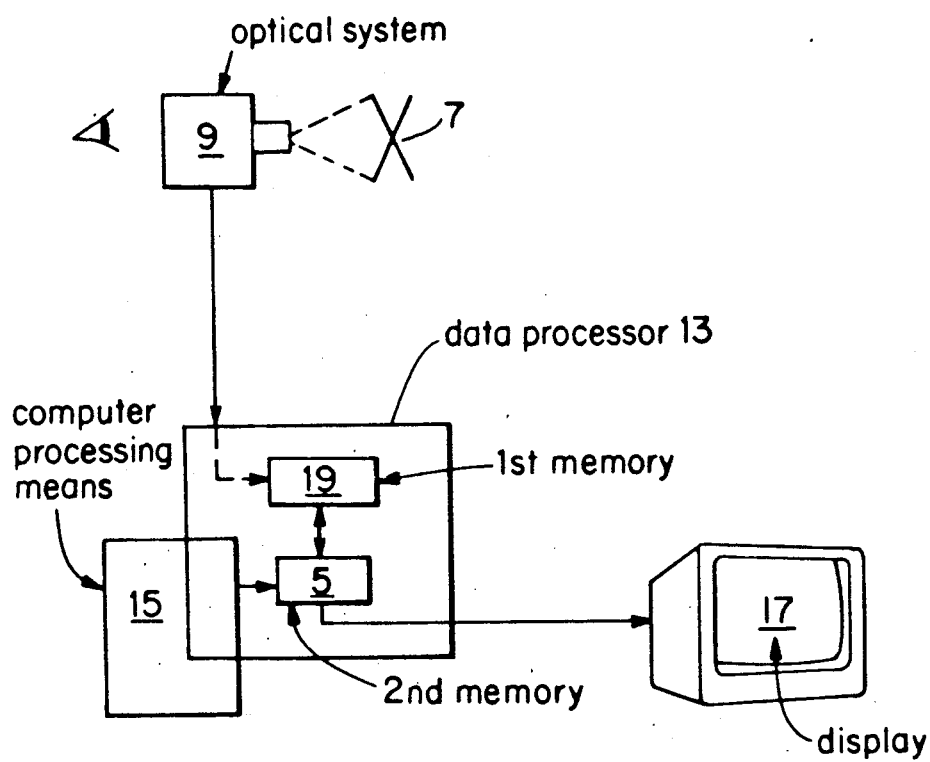
FIG. 2 is a block diagram of an embodiment of the present invention.

In general, the present invention provides a viewing system as shown in FIG. 2. The user views a desired subject 7 through an optical system 9 such as a microscope, a telescope, a camera, a system of lenses and the like, or a combination thereof. The viewed image of the subject is captured by a data processor 13 which is connected to the optical system 9. The data processor 13 receives and stores in a first memory 19 a series of viewed images of the subject 7 as the user views the subject through the optical system 9. Computer or other processing means 15 are associated with the data processor 13. The processing means 15 restores the viewed images, which have been received by the data processor 13 and stored in first memory 19, by manipulating the measured data points of the received images in a second memory 5. A mathematical discussion of this manipulation is presented later. The restored images are thereafter displayed by suitable means, such as CRT 17 connected to the data processor 13.

A particular embodiment of the present invention involves fluorescence microscopy, where cell structures are illuminated by fluorescent dyes and are viewed through an optical microscope to provide an image of the distribution of specific molecules and ions in the cell. 3-D information about the cell is obtained by optical sectioning. This requires focusing the microscope through a series of 128 planes of about 0.25 micrometers apart. Each of the 128 2-D images is acquired by a CCD camera mounted on the microscope and stored as a 128×128 image in a data processor. The stored images have been blurred by distortion and noise as previously stated. The distortion and blurring is removed by a deconvolution process as discussed in "3-D Molecular Distribution in Living Cells by Deconvolution of Optical Sections Using Light Microscopy", by Walter Carrington and Kevin Fogarty, reprinted in the Proceedings of the Thirteenth Northeast Bioengineering Conference, Philadelphia, PA, Mar. 12, 1987. This article is herein incorporated by reference.

In sum, the deconvolution process described in the Carrington/Fogarty article solves the sum of a least square fit of the measured data points and a regularization or smoothing term. In addition, the solution is constrained to non-negative values because the viewed subject is known to have a non-negative density. The solution is also determined by an iterative division of Fourier transforms of functions of the point spread function, or more generally the response function of the optical system 9. In the iterative division, the viewed image is expressed as a convolution of the response function and the function describing the subject 7.

The convolution is preferably performed by a high speed computer or an array processor connected to the data processor in a second memory as shown in FIG. 2.

Figure 1:
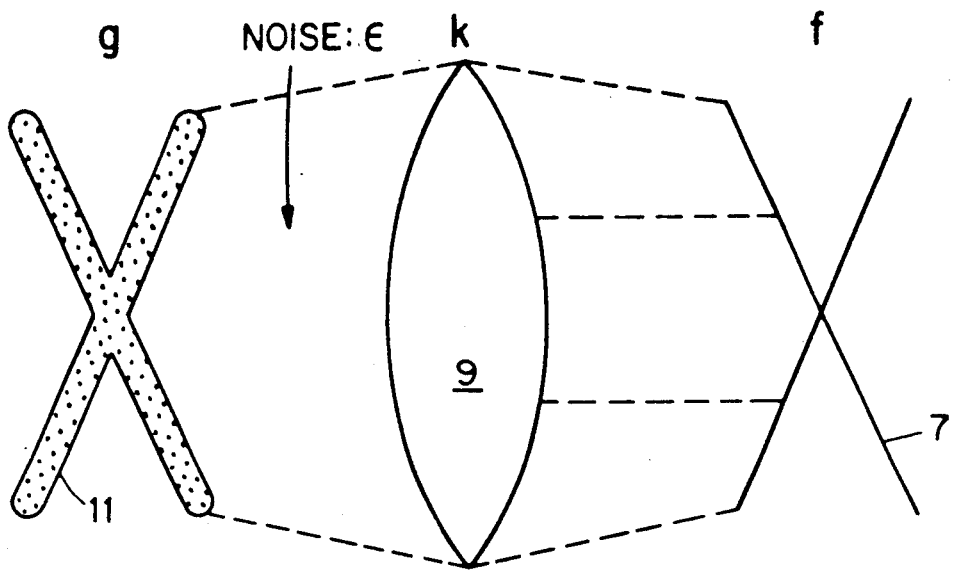
FIG. 1 is an illustration of the distortion and addition of noise to a subject viewed through an optical system.

By way of background, manipulation of stored images to provide a restored image has been accomplished in many ways. The simplest method is a direct inversion of the mathematical statement which is illustrated in FIG. 1.

$$g = h*f + \epsilon$$

where the inverse is given in the Fourier domain by $$F = (1/H)(G + \epsilon)$$

This is not an accurate method because the inversion magnifies the noise in the data excessively.

Another method uses a conventional least square approach in which measurement errors are minimized. The least square solution is expressed as a normalization of the difference of the transformed image (as known by the function k) and the viewed (i.e. measured) image g.

$$|kf - g|^2$$

In addition, a linear smoothing operation enables high frequency oscillations in the direct solution to be damped to a lower amount of high frequency oscillations. This is accomplished by adding to the least square solution a smoothing factor of $$\alpha \int |f(x)|^2 dx$$

Hence, a known equation used to describe the distorted image is $$\Phi(f) = |kf - g|^2 + \alpha \int |f(x)|^2 dx \quad\quad 1$$

This equation is solved for the minimum function f.

In the present invention a further constraint is imposed on the solution of Equation 1. This constraint is where f is greater than or equal to zero, because the subject is known to be non-negative. A trivial calculus approach to solving Equation 1 for the minimum f, by setting the derivative of Equation 1 equal to zero, is not possible since f is a function and f(x) is constrained to be non-negative. The $f(x) \geq 0$ that minimizes Equation 1 is known, however, to have the form $$f(x) = max(\Sigma k_i(x) c_i, 0)$$

at a point x in the subject. The Applicants then take this form of f and substitute it into Equation 1 so that $\Phi(f)$ of Equation 1 is a function of $c_i$. In this form, Equation 1 is then differentiated with respect to c. The derivative of Equation 1, (i.e. $\Phi'(f)$) is then translated into terms of c and set equal to zero. The c which satisfies that relationship defines the f that minimizes Equation 1. The problem can then be expressed in the form $$kf - g + \alpha c = 0 \quad\quad 2$$

where c is a 3D vector of the $c_i$'s.

In prior art methods, Equation 2 was solved for f by Newton's method. In the present invention as outlined in the flow chart in FIG. 3, an auxiliary function is defined by integrating Equation 2 such that the derivative of the auxiliary function is zero to satisfy Equation 2 and then a variation of Newton's method is applied to Equation 2 written in terms of the defined auxiliary function. Such an auxiliary function $\psi(c)$ is stated at 23 and 21 of FIG. 3 as follows:

$$\psi(c) = \tfrac{1}{2} c^+ (M + \alpha I) c - c \cdot g$$

where $c^+$ is the transpose of c.

Next, by Newton's method c has the approximate form $$c_{n+1} = c_n - \Delta \quad\quad 3$$

where $$\Delta = \psi''(c)^{-1} \psi'(c) \quad\quad 4$$

where $\psi'(c) = (M + \alpha I) c - g$, is the gradient of $\psi(c)$ and $\psi''(c) = M + \alpha I$, known as the Hessian matrix.

In the present invention a damped Newton's method is used to replace $\psi''$ with another matrix A, such that $$A = B + \alpha I \qquad 5$$

where B is a matrix of i,j coordinates over all space defined as $$B_{ij} = \int\int\int k_i(x)k_j(x)dx$$

which in terms of the point spread function h of the optical system may be written as $$B_{ij} = \int h(y_i\text{-}x) h(y_j\text{-}x)dx$$

or $B = \Sigma h(y_i\text{-}x_k)h(y_j\text{-}x_k)$ \qquad 6

$$\Delta = (A + \lambda I)^{-1}\psi' \qquad 7$$

It is noted that $B_{ij}$ differs from $M_{ij}$ by having a domain over all points in space instead of over a set of viewed image points D(c).

Solving for $\Delta$ from $\Delta = (A+\lambda I)^{-1}\psi'$ is then as follows.

$$\Delta = (A + \lambda I)^{-1}\psi'$$

$$(A + \lambda I)\Delta = \psi' \qquad 8$$

Equation 8 is then expressed as a convolution which is easier to multiply than the matrices of data of prior art schemes. A "convolution" as used here is defined to follow the statement that:

A summation, over points L, of the product of a function of variables m and L and a function of L, equals the convolution of the two functions at a point m.

From Equations 5 and 8

$$(B + \alpha I + \lambda I)\Delta = \psi'$$

$$(B\Delta + \alpha\lambda + \lambda\Delta = \psi' \qquad 9$$

From Equation 6

$$\begin{aligned}(B\Delta)_i &= \sum_j \sum_k h(y_i - x_k)\, h(y_j - x_k)\, \Delta_j \\ &= \sum_k \sum_j h(y_i - x_k)\, \tilde{h}(x_k - y_j)\, \Delta_j\end{aligned}$$

where $\tilde{h}(x) = h(-x)$; then by the definition of convolution $$\begin{aligned}(B\Delta)_i &= \Sigma h(y_i - x_k)\,((\tilde{h}*\Delta)(x_k)) \qquad \text{Equation 10} \\ &= (h * (\tilde{h}*\Delta))\,(y_i) \\ &= h*\tilde{h}*\Delta(y_i)\end{aligned}$$

where * indicates a convolution.

Substituting Equation 10 into Equation 9

$$h * \tilde{h} * \Delta + \alpha\Delta + \lambda\Delta = \psi' \qquad 11$$

Equation 11 is then solved for $\Delta$ by transforming each side; dividing the the transform of $\psi'$ by the sum of the transforms of $h * \tilde{h}$, $\alpha$ and $\lambda$; and calculating the inverse transform of this quotient.

In particular, a Fourier transform is employed, although other transforms are suitable, such that:

$$(\widehat{h*\tilde{h}*\Delta}) + (\widehat{\alpha\Delta}) + (\widehat{\lambda\Delta}) = (\psi')^\wedge$$

$$\hat{h}\cdot\tilde{\hat{h}}\cdot\hat{\Delta} + \alpha\hat{\Delta} + \lambda\hat{\Delta} = (\psi')^\wedge$$

$$(\hat{h}\cdot\tilde{\hat{h}} + \alpha + \lambda)\cdot\hat{\Delta} = (\psi')^\wedge$$

$$\Delta = \frac{(\psi')^\wedge}{(\hat{h}\cdot\hat{h}+\alpha+\lambda)} = \frac{\Psi'}{H\cdot H^* + \alpha + \lambda} \qquad \text{Equation 12}$$

where $^\wedge$ indicates Fourier transform;

$\Psi'$ is the Fourier transform of $\psi'$; and $H^*$, the Fourier transform of $\tilde{h}$, is the complex conjugate of H, the Fourier transform of h.

Applying the inverse Fourier transform to Equation 12 provides $$\Delta = \text{Inverse Fourier Transform of } \Psi'/(HH^*+\alpha+\lambda)) \qquad 13$$

Figure 3:
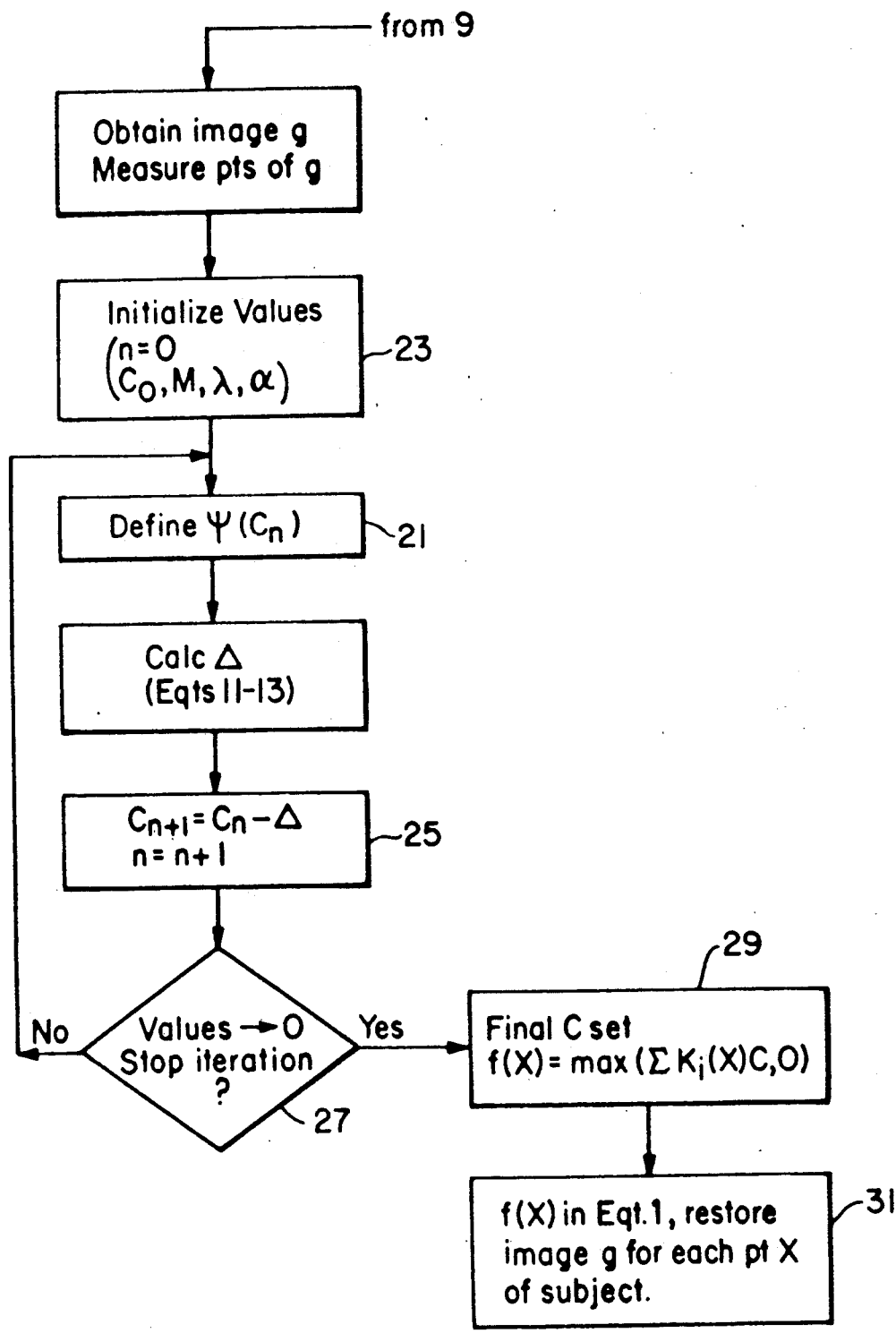
FIG. 3 is a flow chart of processor operation in the embodiment of FIG. 2.

The value of $\Delta$ from Equation 13 is substituted into Equation 3 at 25 in FIG. 3 to define a new c (i.e. $c_{n+1}$) where a first $c_n$ (i.e. $c_0$) is arbitrarily chosen. A series of new c's is iteratively defined in a similar fashion using Equations 3 through 13 and the foregoing procedure.

At 27 in FIG. 23, the iteration is stopped at a final value for c when $\Delta$ approaches 0;

$\psi'$ gets small;

length of $\psi'$ approaches 0;

length of g $\psi$ increases instead of continues to decrease; or a combination thereof.

Once a final value for c is established at 29 in FIG. 3, the $f(x) \geq 0$, that minimizes Equation 1 at a point i in the image g is defined from $f(x) = \max(\Sigma k_i(x)c, 0)$. The newly defined f(x) is substituted into Equation 1, and Equation 1 is used to provide the sought restored image from point to point as indicated at 31 in FIG. 3.

While the invention has been particularly shown and described with reference to embodiments thereof, it will be understood by those skilled in the art that various changes in form and details may be made therein without departing from the spirit and scope of the invention as defined by the appended claims.

We claim:

1. An image restoration device comprising:
an optical viewing member for providing a view of a subject, the optical viewing member responding to each point of the subject according to a response function to provide a viewed image of the subject;
a data processor for receiving from the optical viewing member and storing a series of viewed images of the subject as viewed through the optical viewing member;
computer processing means coupled to the data processor for responding to the viewed images and restoring the viewed images to substantially noiseless, undistorted images, the computer processing means restoring each viewed image by iteratively determining for each point in a viewed image a factor which minimizes noise and distortion at that point, the factor being iteratively determined, according to a formulation of a mathematical definition of the factor, by performance of transform calculations including a mathematical division operation in a transform domain of functions which include the response function of the optical viewing member to determine the factor, transforms of the response function being denominators in the division operation, the division operation enabling avoidance of performance of a matrix inversion operation, and with the determined factors for the points of a viewed image the computer processing means minimizing noise and distortion at each point of the image such that a substantially noiseless, undistorted image is formed; and display means coupled to the computer processing means for providing a view of the substantially noiseless, undistorted images in a non-transform domain.

2. An image restoration device as claimed in claim 1 wherein the factor is iteratively determined through a division operation in a Fourier transform domain of the response function.

3. An image restoration device as claimed in claim 1 wherein the factor is iteratively determined by the relationship $$c_{n+1} = c_n - \Delta$$

where
c is the factor;
n is the number of iterations of c; and
$\Delta$ = inverse Fourier transform of $$(\Psi'/(H H^* + a + \lambda));$$

where $\Psi'$ is the Fourier transform of $\psi'$, $$\psi' = (M + aI) c - g;$$

M is a matrix of viewed image points i,j, and defined as $$M_{ij} = \int_{D(c)} k_i(x) k_j(x) \, dx$$

$D(c)$ is the set of viewed image points in which $\Sigma k_i(x) c_i > 0$, and
$k_i(x)$ is the response function of the optical viewing member at image point i over surrounding points x;
$\alpha$ and $\lambda$ are constants ($\geq 0$);
I is the Identity matrix;
g is an array of measured values of the points in the image;
H is the Fourier transform of h(x) which is another form of the response function $k_i(x)$; and
$H^*$ is the Fourier transform of $\tilde{h}(x)$ in which $$\tilde{h}(x) = h(-x).$$

4. An image restoration device as claimed in claim 3 wherein h(x) is the point spread function of the optical viewing member such that $$k_i(x) = h(y_i - x)$$

where
i is a point of the viewed image; and
$Y_i$ is the corresponding point on the subject.

5. An image restoration device as claimed in claim 1 wherein the series of viewed images received by the data processor from the optical viewing member includes a series of 2-D images of different planes through a 3-D image of the subject.

6. An image restoration device as claimed in claim 1 where the formulation of the mathematical definition of the factor includes a related matrix which replaces a Hessian matrix of the factor such that the division operation replaces a matrix inversion operation and the factor is iteratively determinable in a transform domain of the response function of the optical viewing member.

7. A method of restoring an image of a subject, comprising the steps of:

viewing the subject through an optical viewing system having a response to each point of the subject according to a response function, during the viewing the optical viewing system providing viewed images of the subject;

receiving in a data processor a series of viewed images of the subject as viewed through the optical viewing member;

restoring each viewed image in the data processor by:
(a) iteratively determining, for each point in said viewed image, a factor which minimizes noise and optical distortion, the factor being iteratively determined according to a formulation of a mathematical definition of the factor which allows performance of transform calculations including a division calculation with a transform of the response function of the optical viewing member as a denominator in the division calculation to determine the factor, such that performance of matrix inversion is avoidable,
(b) with the determined factors of the viewed image, minimizing noise and distortion at each point in said viewed image by manipulating said points, and
(c) forming a substantially noiseless, undistorted image from the manipulated points of the viewed image; and displaying on display means coupled to the data processor each substantially noiseless and undistorted image for each viewed image restored by the data processor.

8. A method as claimed in claim 7 wherein the factor is iteratively determined through a division operation with a Fourier transform of the response function.

9. A method as claimed in claim 7 wherein the factor is iteratively determined by the relationship $$c_{n+1} = c_n - \Delta$$

where
c is the factor;
n is the number of iterations of c; and
$\Delta$ = inverse Fourier transform of $$(\Psi'/(H H^* + a + \lambda));$$

where $\Psi'$ is the Fourier transform of $\psi'$, $$\psi' = (M + aI) c - g;$$

M is a matrix of viewed image points i,j, and defined as $$M_{ij} = \int_{D(c)} k_i(x) k_j(x) \, dx$$

$D(c)$ is the set of viewed image points in which $\Sigma k_i(x) c_i > 0$, and $k_i(x)$ is the response function of the optical viewing member at image point i over surrounding points x;
$\alpha$ and $\lambda$ are constants ($\geq 0$);
I is the Identity matrix;
g is an array of measured values of the points in the image;

H is the Fourier transform of h(x) which is another form of the response function $k_i(x)$; and
H* is the Fourier transform of $\hat{h}(x)$ in which $$\hat{h}(x) = h(-x).$$

10. A method as claimed in claim 9 wherein h(x) is the point spread function of the optical viewing member such that $$k_i(x) = h(y_i - x)$$

where
i is a point of the viewed image; and
$y_i$ is the corresponding point on the subject.

11. A method as claimed in claim 7 wherein the step of receiving in a data processor a series of viewed images of the subject includes receiving series of images of parallel planes through a 3-D image of the subject as viewed through the optical viewing member.

12. A method as claimed in claim 7 wherein the step of restoring each viewed image includes a formulation of a mathematical definition of the factor which replaces a Hessian matrix of the factor with a related matrix such that a division operation replaces a matrix inversion operation and the factor is iteratively determinable in a transform domain of the response function of the optical viewing member.

13. An image restoration device comprising:
(i) an optical viewing member for providing a view of a subject, the optical viewing member responding to each point of the subject according to a response function to provide a viewed image of the subject;
(ii) a data processor for receiving from the optical viewing member and storing a series of viewed images of the subject as viewed through the optical viewing member;
(III) computer processing means associated with the data processor for restoring the viewed images to substantially noiseless, undistorted images, the computer processing means restoring each viewed image by:
(a) iteratively determining for each point in a viewed image a factor which minimizes noise and distortion at that point, the factor being iteratively determined according to a formulation of a mathematical definition of the factor, by performance of transform calculations including a division operation in a transform domain of functions which include the response function of the optical viewing member to determine the factor;
the factor being iteratively determined by the relationship $$c_{n+1} = c_n - \Delta$$

where
c is the factor;
n is the number of iterations of c; and
$\Delta$ = inverse Fourier transform of $$(\Psi'/(H H^* + \alpha + \lambda));$$

where
$\Psi'$ is the Fourier transform of $\psi'$, $$\psi' = (M + \alpha I) c - g;$$

M is a matrix of viewed image points i, j, and defined as $$M_{ij} = \int_{D(c)} k_i(x) \, k_j(x) \, dx$$

D(c) is the set of viewed image points in which $\Sigma k_i(x) c_i > 0$, and
$k_i(x)$ is the response function of the optical viewing member at image point i over surrounding points x;
$\alpha$ and $\lambda$ are constants ($\geq 0$);
I is the Identity matrix;
g is an array of measured values of the points in the image;
H is the Fourier transform of h(x) which is another form of the response function $k_i(x)$; and
H* is the Fourier transform of $\hat{h}(x)$ in which $$\hat{h}(x) = h(-x); \text{ and}$$

(b) with the determined factors of a viewed image, minimizing noise and distortion at each point of the viewed image such that a substantially noiseless, undistorted image is formed; and
(iv) display means coupled to the computer processing means for providing a view of the substantially noiseless, undistorted images in a non-transform domain.

14. An image restoration device as claimed in claim 13 wherein h(x) is the point spread function of the optical viewing member such that $$k_i(x) = h(y_i - x)$$

where
is a point of the viewed image; and
$y_i$ is the corresponding point on the subject.

15. A method of restoring an image of a subject, comprising the steps of:
viewing the subject through an optical viewing system having a response to each point of the subject according to a response function, during the viewing the optical viewing system providing viewed images of the subject;
receiving in a data processor a series of viewed images of the subject as viewed through the optical viewing member;
restoring each viewed image in the data processor by:
(a) iteratively determining, for each point in a viewed image, a factor which minimizes noise and optical distortion, the factor being iteratively determined according to a formulation of a mathematical definition of the factor which allows performance of transform calculations including division with a transform of the response function of the optical viewing member to determine the factor,
the factor being iteratively determined by the relationship $$c_{n+1} = c_n - \Delta$$

where
c is the factor;
n is the number of iterations of c; and
$\Delta$ - inverse Fourier transform of $$(\Psi'/(H H^* + \alpha + \lambda));$$

where $\Psi'$ is the Fourier transform of $\psi'$, $$\psi' = (M + \alpha I) c - g;$$

M is a matrix of viewed image points i,j, and defined as $$M_{ij} = \int_{D(c)} k_i(x) k_j(x) dx$$

D(c) is the set of viewed image points in which $\Sigma k_i(x) c_i > 0$, and $k_i(x)$ is the response function of the optical viewing member at image point i over surrounding points x;

$\alpha$ and $\lambda$ are constants $(\geq 0)$;

I is the Identity matrix;

g is an array of measured values of the points in the image;

H is the Fourier transform of h(x) which is another form of the response function $k_i(x)$; and H* is the Fourier transform of h(x) in which $$h(x) = h(-x);$$

(b) with the determined factors of the viewed image, minimizing noise and distortion at each point in said viewed image by manipulating said points; and (c) forming a substantially noiseless, undistorted image from the manipulated points of the viewed image.

16. A method as claimed in claim 15 wherein h(x) is the point spread function of the optical viewing member such that $$k_i(x) = h(y_i - x)$$

where
 i is a point of the viewed image; and
 $y_i$ is the corresponding point on the subject.

* * * * *

UNITED STATES PATENT AND TRADEMARK OFFICE
CERTIFICATE OF CORRECTION

PATENT NO. : 5,047,968

DATED : September 10, 1991

INVENTOR(S) : Walter A. Carrington and Kevin E. Fogarty

It is certified that error appears in the above-identified patent and that said Letters Patent is hereby corrected as shown below:

Col. 9, line 15, delete "$y_1$" and insert instead ---$y_i$---.
Col. 9, line 38, delete "(III)" and insert instead ---(iii)---.
Col. 10, line 36, before "is" insert ---i---.
Col. 10, line 65, before "inverse" delete "-" and insert instead --- = ---

Signed and Sealed this

Fifteenth Day of December, 1992

Attest:

DOUGLAS B. COMER

Attesting Officer     Acting Commissioner of Patents and Trademarks